Patented Mar. 23, 1954

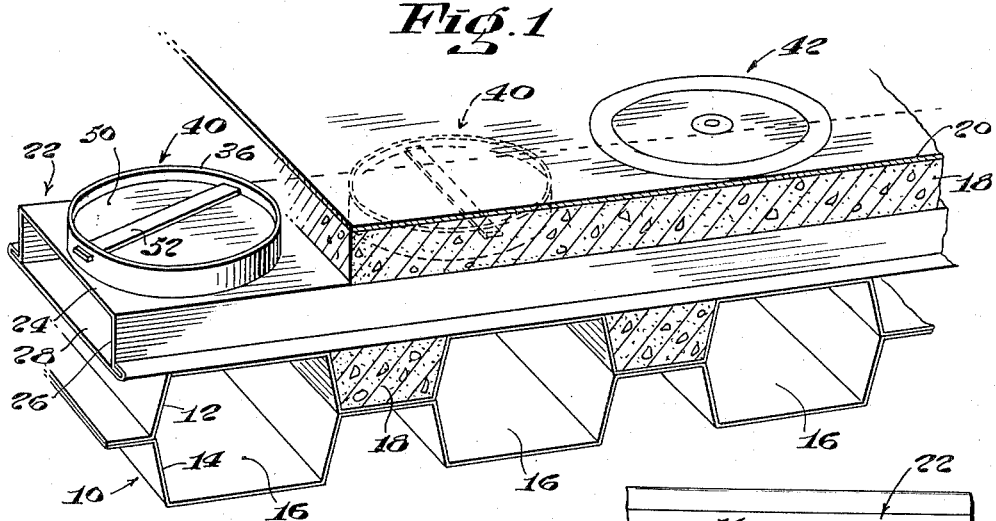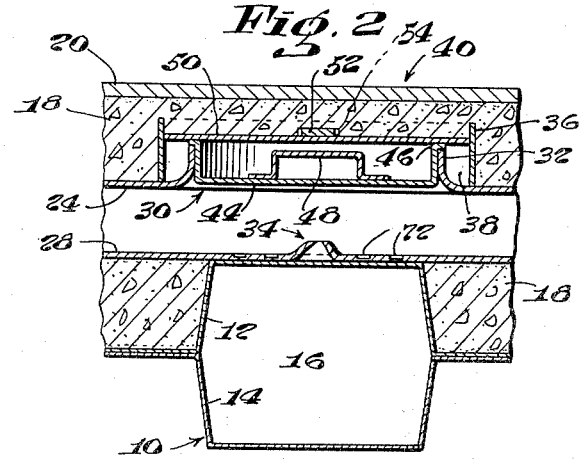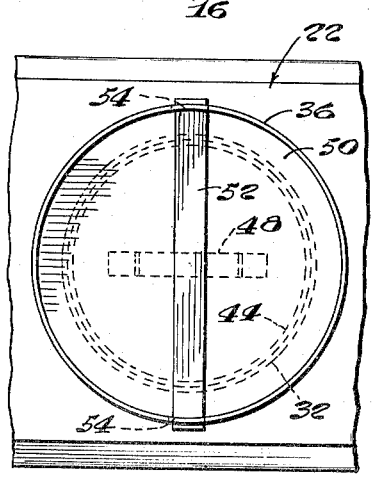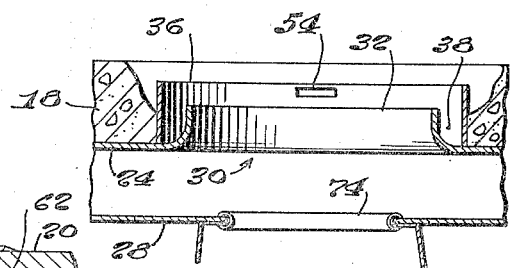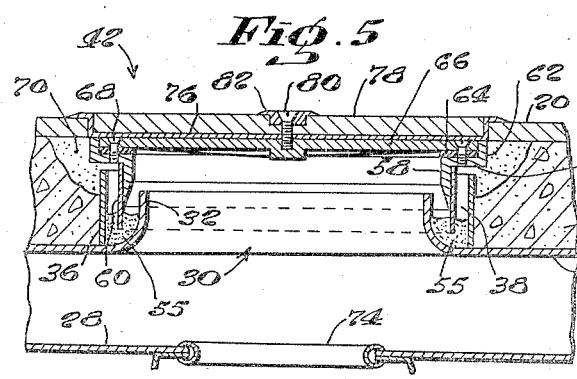

2,672,749

UNITED STATES PATENT OFFICE 2,672,749

WIRE DISTRIBUTING CELLULAR METAL FLOOR

Joseph W. Wiesmann, Pittsburgh, Pa., assignor to H. H. Robertson Company, Pittsburgh, Pa., a corporation of Pennsylvania Application October 1, 1948, Serial No. 52,251

2 Claims. (Cl. 72—16)

This invention relates to a wire distributing cellular metal floor.

The invention has for an object to provide a novel and improved wire distributing cellular metal floor for use in the construction of a building which is characterized by novel structure whereby economies may be effected in the manufacture and initial installation of the floor, and which may be readily made available for expansion of the electrical service as subsequently required, in a simple and efficient manner.

With this general object in view, and such others as may hereinafter appear, the invention consists in the wire distributing cellular metal floor and in the various structures, arrangements and combinations of parts hereinafter described and particularly defined in the claims at the end of this specification.

In the drawings illustrating the preferred embodiment of the invention, Fig. 1 is a perspective view of a wire distributing cellular metal floor embodying the present invention; Fig. 2 is a cross sectional view of a concealed access opening provided at an initially unused junction point and covered over by the concrete floor fill; Fig. 3 is a plan view of the structure shown in Fig. 2 before being covered over by the floor fill; Fig. 4 is a cross sectional view, similar to Fig. 2, showing the flooring broken away and the unit opened up at the junction point prepared to receive an upper section providing access to an underlying wiring duct; and Fig. 5 is a cross sectional view of the completed junction unit with the upper section installed.

In general, the present invention relates to an improvement in a wire distributing metal flooring system such as is disclosed in the United States patent to Young et al., No. 2,125,366. Such systems embody a multicellular metal flooring through which wires may be drawn to provide electrical service to different parts of the building. The wires are fed to the different cells by a cross-over duct mounted to extend transversely of and preferably along the top of the multicellular flooring and through which the feed wires may be extended. The cross-over ducts are provided with junction units at selected intersecting points of the duct with the cells thus providing access openings to permit electrical service to be furnished to selected of the flooring cells.

In practice, a different cross-over duct is preferably used for each type of electrical service provided. For example, low tension lines may be provided in one cross-over duct and high tension lines in a second duct, and different flooring cells are preferably used for distributing the wires from each cross-over duct. Thus, when two cross-over ducts are used it has been the practice in such prior wire distributing systems to provide a complete junction unit at alternate intersecting cells, the junction units of one cross-over duct being staggered relative to the other so that each and every cell in the flooring is immediately available for wire distribution.

In actual practice, only a very small percentage of such available and immediately usable cells are actually used in an initial installation, and those not used are covered over by the floor covering. Although the above described system is of advantage in that each cell is immediately available for wiring purposes, it will be apparent that the provision of a complete junction unit at each intersection of the cross-over duct with an underlying wire distributing cell in such prior systems involves a great deal of unnecessary time, labor and expense in the initial installation, especially when it is considered that a majority of the cells may never be used.

In accordance with the present invention, the cross-over ducts are provided with complete junction units at those cell intersections only which are to be immediately used, the intersections at the remaining cells being provided with concealed access openings which may be initially completely covered over with the floor fill, but which may be opened up when subsequently required and provided with an upper section to form a complete junction unit. Thus, in those installations in which all of the cells are not made immediately available for use, the present wire distributing apparatus effects substantial economies in manufacturing costs and material, and also in the time and labor involved in the initial installation.

Referring now to the drawings, 10 represents one type of cellular metal flooring used in the erection of buildings and which as herein shown, comprises a plurality of units formed by assembling and welding together an upper corrugated sheet 12 and a lower corrugated sheet 14 to form in effect a series of closely spaced parallel hollow beams or cells 16 upon the top of which a concrete fill 18 is poured and the finish flooring 20 is laid, as illustrated in Fig. 1. In practice, it is preferred to manufacture the cellular metal floor in units of varying lengths according to the steel fabrication of the building in which the floor is to be incorporated, and during the erection of the floor, the units are laid end to end so that the cells of one unit cooperate with and form extensions of the cells of a second unit to provide a plurality of continuous conduits extending across the building and through which wiring for electrical service of various types may be drawn.

As illustrated in Fig. 1, the preferred form of cross-over duct comprises an elongated, hollow, rectangular shaped conduit 22 having an upper section provided with a top wall 24 and depending side walls 26 having their edges bent outwardly, and having a lower section 28 comprising the lower wall having its longitudinal marginal edges turned upwardly and inwardly to embrace the outwardly bent edges of the side walls 26, the upper and lower sections being preferably welded together to form an integral unit. The top wall 24 of the cross-over duct may be provided with spaced access openings 30 in alignment with all or selected of the underlying cells 16 preferably at the points of intersection of the cells with the cross-over duct, each opening being defined by an upstanding cylindrical wall or rim 32, and the lower wall 28 is provided with spaced pilots 34 in alignment with the access openings which are particularly adapted for the reception of a tool, such as a hole saw, to guide the tool when it is desired to complete an opening from the duct 22 into a cell positioned below.

The upper wall 24 of the cross-over duct 22 is further provided with an outer ring comprising an annular upstanding band 36 placed concentrically about the upstanding rim 32 at each junction point and welded or otherwise secured to the upper wall 24. The upstanding band 36 if of larger diameter and of greater height than the circular rim 32 and provides an annular space 38 between the rim and the band, as clearly shown in Fig. 2.

In practice, when it is desired to conceal an unused access opening, the opening 30 may be covered by suitable protective members, indicated generally at 40, over which the concrete floor fill is poured, as shown in Fig. 2, and when it is desired to provide an immediately available junction unit, the access opening is provided with an upper section, indicated generally at 42, the opening being completed through the lower wall 28 of the duct 22 and the top wall of the cell 16 for communication with the underlying cell, as illustrated in Fig. 5.

Referring now particularly to Fig. 2, an unused access opening is first provided with a cup shaped closure 44 arranged to fit snugly within the circular rim 32, the closure being provided with an outwardly extended flange 46 at its upper end which may rest against and extend over the upper edge of the circular rim 32. A handle 48 secured to the closure may be provided for convenience in removing the same. A flat circular disc 50 is then fitted snugly within the upstanding band 36 and on top of the flanged portion 46 of the closure 44. The disc 50 may and preferably will be secured in place by a clip 52 extended diametrically across the disc and projecting through opposed openings 54 formed in the band 36, as shown. The unused access opening is then covered by the concrete floor fill in the usual manner, the flat disc 50 providing a protective cover for the concealed access opening and the annular space 38 between the upstanding rim 32 and band 36, as clearly shown in Fig. 2.

When it is subsequently desired to make use of a concealed access opening, the concrete above the opening is broken away as shown in Fig. 4, and the clip 52 and disc 50 are removed revealing the clean annular space 38. The space 38 is then provided with a suitable cement, such as iron cement indicated at 55, into which the lower portion of the junction unit section 42 is extended to secure the unit in place upon hardening of the cement. As shown in Fig. 5, the upper section of the junction unit comprises an annular member 56 having an inner depending flange 58 to which a circular band 60 may be secured, the lower portion of the band 60 being embedded in the cement 55. The annular member 56 is further provided with an outer upstanding flange 62 forming a circular recessed portion arranged to receive a gasket 64 and a cover member 66 which may be secured to the ring 56 by screws 68. As illustrated, the unit 42 is located with the top of the member 56 and cover 66 flush with the screed line of the concrete floor fill. If the concrete fill has been excessively broken, the unit may be further grouted in by concrete as indicated at 70 in Fig. 5.

The closure 44 may then be removed and the opening completed through the lower wall 28 and the top of the cell positioned below. In practice, the opening through the wall 28 may be defined by a circular grooved portion 72 concentric with the pilot 34 for guiding the hole saw in completing an entrance of a predetermined size into the cell below, the cut opening being preferably provided with a grommet 74, as shown.

When a floor covering is used, a floor covering adapter comprising a circular flanged member 76 may be placed on top of the junction unit and provided with an insert 78 of the floor covering, the adapter being secured to the junction unit cover 66 by a central screw 80, and washer 82. In practice, the centrally disposed screw 80 may serve as a marker to assist in locating the equidistantly spaced concealed units, and some of the concealed units may be provided with similar markers for this purpose.

It will be understood that when the wire distributing system is initially installed, an upper section 42 is provided at those junction points where they are known to be immediately required, and are placed in position before the concrete fill is applied, the remaining junction points being provided with the covering disc 50 and covered over with the concrete fill as shown in Fig. 2.

While the preferred embodiment of the invention has been herein illustrated and described, it will be understood that the invention may be embodied in other forms within the scope of the following claims.

Having thus described the invention, what is claimed is:

1. In a wire distributing cellular metal floor of the character described, a cross over duct comprising an elongated hollow member provided with an access opening in the top wall thereof defined by an upstanding tubular extension from said wall, a circular band upstanding from said wall and concentric with and extended above said tubular extension and forming an annular recess defined by the top wall and said upstanding band and extension, and a circular disk fitted within said circular band and engaging the upper end of said extension for covering said access opening and entirely enclosing the annular recess to protect the latter from the subsequently poured floor fill, said circular disk being adapted for removal upon breaking through the floor to permit insertion of an upper section into said annular recess.

2. In a wire distributing cellular metal floor of the character described, a cross over duct comprising an elongated hollow member provided with an access opening in the top wall thereof defined by an upstanding tubular extension from said wall, a circular band concentric with said extension secured to and upstanding from said wall and forming with said extension an annular recess defined by the top wall and said upstanding band and extension and adapted to receive an upper section to permit access to the duct, and means for covering said access opening comprising a cup-shaped closure member fitted within said extension, a circular disk fitted within said band and engaging the upper edge of said closure member for covering said access opening and entirely enclosing the annular recess to protect the latter from the subsequently applied floor fill, said covering means being adapted for subsequent removal upon breaking through the floor to permit insertion of an upper section into said annular recess when subsequently required.

JOSEPH W. WIESMANN.

References Cited in the file of this patent

UNITED STATES PATENTS

| Number | Name | Date |
|---|---|---|
| Re. 17,290 | Ashley, Jr. | May 7, 1929 |
| 1,530,200 | Richardson et al. | Mar. 17, 1925 |
| 2,041,965 | Sargent | May 26, 1930 |
| 2,125,366 | Young | Aug. 2, 1938 |
| 2,202,147 | Gerriets | May 28, 1940 |
| 2,445,197 | Wiesmann | July 13, 1948 |